United States Patent
Landt (10) Patent No.: US 8,801,508 B2
(45) Date of Patent: Aug. 12, 2014

(54) APPARATUS AND METHOD FOR SEPARATING THE WISHBONE FROM EVISCERATED POULTRY CARCASSES

(75) Inventor: Andreas Landt, Lubeck (DE)

(73) Assignee: Nordischer Maschinenbau Rud. Baader GmbH+ Co. KG (DE)

( * ) Notice: Subject to any disclaimer, the term of this patent is extended or adjusted under 35 U.S.C. 154(b) by 0 days.

(21) Appl. No.: 14/130,416

(22) PCT Filed: Jul. 3, 2012

(86) PCT No.: PCT/EP2012/062934
§ 371 (c)(1),
(2), (4) Date: Dec. 31, 2013

(87) PCT Pub. No.: WO2013/007559
PCT Pub. Date: Jan. 17, 2013

(65) Prior Publication Data
US 2014/0134935 A1 May 15, 2014

(30) Foreign Application Priority Data
Jul. 11, 2011 (DE) .......................... 10 2011 107 067

(51) Int. Cl.
A22C 17/00 (2006.01)
(52) U.S. Cl.
USPC .......................................................... 452/135
(58) Field of Classification Search
USPC .................. 452/135, 136, 149–153, 155, 156
See application file for complete search history.

(56) References Cited

U.S. PATENT DOCUMENTS

| | | | | |
|---|---|---|---|---|
| 4,682,386 A | * | 7/1987 | Hazenbroek et al. | 452/136 |
| 4,951,354 A | | 8/1990 | Callsen et al. | |
| 5,045,024 A | | 9/1991 | Diesing | |
| 5,407,383 A | * | 4/1995 | Diesing et al. | 452/169 |
| 5,466,185 A | * | 11/1995 | Martin et al. | 452/165 |
| 5,545,083 A | * | 8/1996 | Bargele et al. | 452/136 |
| 5,562,532 A | | 10/1996 | Horst et al. | |

(Continued)

FOREIGN PATENT DOCUMENTS

WO 2011068402 A2 6/2011

OTHER PUBLICATIONS

PCT/EP2012/062934—International File Date: Jul. 3, 2012—International Search Report; Nordischer Maschinenbau Rud. Baader GmbH + Co. KG; 3 pages.

*Primary Examiner* — Richard Price, Jr.
(74) *Attorney, Agent, or Firm* — Schmeiser, Olsen & Watts, LLP (57) ABSTRACT

The invention relates to an apparatus for automatically separating the wishbone from eviscerated poultry bodies, comprising a revolving conveyor with at least one holding apparatus with a support body receiving and holding the poultry bodies during transport through the apparatus, and at least one processing station along a conveying line of the conveyor, one of the processing stations being configured as a cutting unit for separating the wishbone from the poultry body, characterized in that the cutting unit has a rotational drive, a cutting means and a rotary arm that connects the cutting means and the rotational drive and is designed to guide the cutting means in the rotational direction along a curved path, with the rotary arm and the cutting means forming an at least essentially L-shaped arrangement and the cutting means having a main cutting edge that is interrupted by a recess and is oriented at least essentially parallel to the rotational axis of the rotary arm. The invention also relates to a method corresponding to the apparatus.

18 Claims, 4 Drawing Sheets

(56) References Cited

U.S. PATENT DOCUMENTS

| | | | |
|---|---|---|---|
| 5,643,074 A * | 7/1997 | Linnenbank | 452/165 |
| 5,827,116 A * | 10/1998 | Al et al. | 452/170 |
| 5,833,527 A * | 11/1998 | Hazenbroek et al. | 452/170 |
| 6,007,416 A | 12/1999 | Janssen et al. | |
| 7,063,611 B2 * | 6/2006 | Nolten et al. | 452/160 |
| 8,231,444 B2 * | 7/2012 | De Vos et al. | 452/136 |
| 8,308,535 B2 * | 11/2012 | De Vos et al. | 452/136 |
| 8,435,100 B2 * | 5/2013 | De Vos et al. | 452/136 |
| 8,500,522 B2 * | 8/2013 | Drabbels et al. | 452/136 |
| 8,529,322 B2 * | 9/2013 | De Vos et al. | 452/165 |
| 2004/0235409 A1 | 11/2004 | Nolten et al. | |
| 2009/0275275 A1 | 11/2009 | Evers | |
| 2011/0045756 A1 | 2/2011 | De Vos et al. | |

* cited by examiner

APPARATUS AND METHOD FOR SEPARATING THE WISHBONE FROM EVISCERATED POULTRY CARCASSES

CROSS-REFERENCE TO RELATED APPLICATIONS

This application claims priority to PCT Application No. PCT/EP2012/062934, having a filing date of Jul. 3, 2012, the entire contents of which are hereby incorporated by reference.

FIELD OF TECHNOLOGY

The invention relates to an apparatus for automatically separating the wishbone from eviscerated poultry bodies, comprising a revolving conveyor with at least one holding apparatus with a support body for receiving and holding the poultry bodies during transport through the apparatus, and at least one processing station along a conveying line of the conveyor, wherein one of the processing stations is configured as a cutting unit for separating the wishbone from the poultry body.

BACKGROUND

The invention also relates to a method for automatically separating the wishbone from eviscerated poultry bodies using a cutting means, wherein each poultry body is held by a holding apparatus of a revolving conveyor, wherein the conveyor transports the holding apparatuses in a direction of transport along at least one processing station, by means of which the wishbone is separated from the poultry body.

Such apparatuses and methods for separating the wishbone from eviscerated poultry bodies are known from the state of the art. The revolving conveyor with the at least one holding apparatus is usually part of an apparatus for processing animal bodies or parts of animal bodies and is used particularly in processing poultry. The eviscerated poultry bodies are thereby often placed as material to be processed in a loading area on one of the previously mentioned holding apparatuses or, more precisely, on one of the support bodies of the holding apparatuses. A plurality of such holding apparatuses is particularly preferably attached to said revolving conveyor. The conveyor transports the holding apparatuses and thus the eviscerated poultry bodies from processing station to processing station. One of these processing stations is the cutting unit designed for separating the wishbone from the poultry body. Along the cutting unit, the holding apparatus is preferably oriented in a manner so that the breastbone of the poultry body points downward or in the direction of the floor and the neck of the poultry body points in the direction of conveyance of the conveyor.

A system for automatic separation of the wishbone of eviscerated poultry bodies is known from the patent document DE 60 2004 006 451 T2. To prevent breakage of the wishbone or contamination of the fillet by bone splinters during automatic separation of the wishbone, an apparatus and a method are presented in this document. According to the method, the wishbone is twisted out of the shoulder joint. A processing station adapted accordingly for this includes a piercer and a separation blade. To separate the wishbone, the piercer is first inserted into the body from above between the shoulder joint and the wishbone. After that the piercer is moved away by the holding apparatus of the poultry body, which exerts a certain pressure on the wishbone. The displacement of the piercer thus leads to a corresponding displacement of the wishbone. After the displacement of the piercer, a separation blade, which was previously arranged on the breast side of the poultry body, moves back and forth in a vertical plane with respect to the poultry body, so that the separation blade cuts the poultry body below the wishbone and below a lowest position of the piercer.

Such known apparatuses and methods for automatic separation of the wishbone of eviscerated poultry bodies thus have the disadvantage that multiple processing steps are necessary to separate the wishbone from the eviscerated poultry body without damage. In practical application, the effort accompanying the plurality of processing steps required results in correspondingly high costs and moreover in many cases also limits the transport speed of the conveyor. Furthermore, due to the multiplicity of elements engaging with the poultry body to separate the wishbone from the eviscerated poultry body, the known methods and means rely on complex control and/or regulation to coordinate the motion sequences of the multiple elements engaging with the poultry body with one another. The high mechanical complexity and corresponding high complexity of control and regulation also limit the known apparatuses with regard to their maximum processing speed.

It is therefore the task of the present invention to provide an apparatus which is as simple and cost-effective as possible and a corresponding method for complete removal of the wishbone from the body of an eviscerated poultry body without damage.

SUMMARY

The task is solved by an apparatus of the type mentioned hereinbefore in that the cutting unit has a rotational drive, a cutting means and a rotary arm that connects the cutting means and the rotational drive, said arm being designed to guide the cutting means in the rotational direction along a curved path, the rotary arm and the cutting means forming an at least essentially L-shaped arrangement and the cutting means having a main cutting edge that is interrupted by a recess and is oriented at least essentially parallel to the rotational axis of the rotary arm. The L-shaped arrangement and the recess in particular ensure in a simple and reliable manner that the cutting means or the main cutting edge can be guided along a curved path through the eviscerated poultry body to remove the wishbone completely from the poultry body without destroying the wishbone or contaminating other meat products with bone splinters from the wishbone. This is because the L-shaped arrangement and the recess of the cutting means ensure that the main cutting edge and the lowest point of the recess have different radii with respect to the rotational axis of the rotary arm. A possible obstacle on a curved path of the main cutting edge which should not be severed by the main cutting edge nor collide with it can be "avoided" by means of the recess. The previously mentioned radii which deviate from one another enable the main cutting edge to cut laterally past the obstacle while the recess is guided over the obstacle. It is thus possible according to the invention that the main cutting edge is aligned at least essentially parallel to the rotational axis of the rotary arm. This parallel orientation is also preserved when the cutting means is guided along the curved path. Thus the cutting means or the main cutting edge can penetrate symmetrically into the poultry body while the forces produced by a corresponding cut also act at least essentially symmetrically upon the wishbone. Due to said orientation and the associated effects, the wishbone can be removed from the poultry body without damage. Furthermore, the processing speed of the apparatus according to the invention can be increased significantly due to the surprisingly simple motion sequence which can be performed using the apparatus according to the invention as opposed to known apparatuses for automatic separation of the wishbone from eviscerated poultry bodies.

An advantageous embodiment of the apparatus according to the invention is distinguished by the holding apparatus having a clamping apparatus with at least one clamping lever which can be moved against the support body to fixate the poultry body on the support body. This can ensure secure and reliable holding during transport as well as during processing of the poultry body in one of the processing stations. The fixation of the poultry body is achieved by the clamping apparatus, which is part of the holding apparatus. In this context, "against the support body" does not necessarily mean that direct contact exists between the clamping lever and the support body. It matters more that the clamping lever be movable in the direction of the support body in such a manner that the poultry body, when taking a chicken as an example, the breastbone or breastbone plate thereof, be clamped between the clamping lever and the support body and thus fixated. For this purpose the clamping lever can be designed to grip in a clamping position in the area between the wishbone, the coracoid and the breastbone of the poultry body. The fixation of the poultry body according to the invention facilitates an even more precise cut through the poultry body to separate the wishbone. The certainty of removing the wishbone from the poultry body without damage is increased by correspondingly higher precision.

A further advantageous embodiment of the apparatus is characterized in that the main cutting edge is oriented horizontally and perpendicular with respect to a direction of transport of the holding apparatus. The wishbone of the poultry body transported in a lying position along the cutting unit can be removed from the poultry body without damage with particular ease using a correspondingly oriented main cutting edge. This is because the corresponding orientation of the main cutting edge ensures in a particularly simple and reliable manner that the main cutting edge can plunge symmetrically into the poultry body or beneath the wishbone and thus also brings about an advantageous symmetrical distribution of force through the cut onto the poultry body or the wishbone. The risk of breaking the wishbone is significantly reduced by the corresponding orientation of the main cutting edge.

A further advantageous embodiment of the apparatus is characterized in that the cutting means, the rotary arm and the rotational drive are oriented with respect to the conveyor in a manner that the clamping lever and/or the tip of the carina of the breastbone of the poultry body is able to be guided through the recess and/or that the main cutting edge is able to be guided past the tip of the carina and/or the clamping lever on both sides. In other words, corresponding orientation of the cutting means, the rotary arm and/or the rotational drive can prevent a collision of the main cutting edge with the tip of the carina and/or the clamping lever. It has already been explained that the base of the recess or the lowest point of the recess and the main cutting edge can have different radii with respect to the rotational axis of the rotary arm. Objects along the curved path which would collide with a theoretically continuous main cutting edge are passed over by the recess according to the invention so that no collision occurs. Examples of relevant obstacles for the main cutting edge are the clamping lever and/or the tip of the carina of the breastone. The last advantageous embodiment of the apparatus described is thus also characterized in that the recess is able to be guided over the clamping lever and/or the tip of the carina of the breastbone without collision while the main cutting edge is able to be guided past the tip of the carina or the clamping lever on both sides without collision. The wishbone of the poultry body can thus be separated from the poultry body completely and without damage with particular ease.

A particularly advantageous embodiment of the apparatus is characterized in that the width of the recess is greater than the greatest width of the clamping lever and/or the tip of the carina of the breastbone. Thus it is ensured in a simple and reliable manner that the main cutting edge is able to be guided past the clamping lever and/or the tip of the carina on both sides.

A further advantageous embodiment of the apparatus is distinguished in that the cutting means is constructed in one piece. A corresponding embodiment can be produced with particular ease and cost-effectiveness. Furthermore, a corresponding embodiment ensures in a simple and reliable manner that the cutting means separates the wishbone symmetrically from the poultry body, because a one-piece cutting means can have particularly high rigidity and/or stability of form.

A further advantageous embodiment of the apparatus is distinguished in that the cutting means is arranged at an angle between 80° and 135°, particularly preferably at an angle between 80° and 100°, or, for example, at an angle at least essentially 90° with respect to a longitudinal axis of the rotary arm. The L-shaped arrangement of the cutting means and the rotary arm with respect to one another is thus preferably not limited to an angle of exactly 90°, but instead can be arranged in the range of angles previously mentioned. Moreover, angles which are 135° or greater are also possible and conceivable. For the angle to be chosen, it is decisive that a radial distance between the lowest edge of the recess and the rotational axis of the rotary arm be smaller than the radial distance between the main cutting edge and the rotational axis of the rotary arm. The previously mentioned angle can be increased to increase the difference between the radii. As an alternative it is also possible to increase the depth of the recess. Corresponding design adaptation can thus enable the recess to pass over any obstacles without a collision resulting with the main cutting edge.

A further advantageous embodiment of the apparatus is characterized in that at the base of the recess or at the lowest edge of the recess an auxiliary cutting means is arranged and/or designed which is oriented at least essentially parallel to the main cutting edge. The area of the poultry body which is not covered due to the recess of the main cutting edge can thus be cut by means of the auxiliary cutting means. Thus it is ensured in a simple and reliable manner that the wishbone can be completely separated from the poultry body.

The cutting means advantageously has at least one guiding surface starting from the main cutting edge and extending in the direction of the rotary arm. The function of the guiding surface is to guide the part of the wishbone and/or the meat already removed by the main cutting edge. Due to the dimensional stability of the wishbone and/or the inner cohesion of the meat, the wishbone and/or the meat in the area of the recess is also guided along with the part of the wishbone and/or meat already separated. This also applies particularly to a functional development of the apparatus characterized in that a radial distance of the main cutting edge from the rotational axis of the rotary arm is greater than the radial distance of the auxiliary cutting means from the rotational axis of the rotary arm. This is because the guidance surface can be used to guide the cutting edges in the poultry body bordering on the recess, which were made by the main cutting edges, to the auxiliary cutting means. Thus the auxiliary cutting means enables the incision in the poultry body interrupted by the main cutting edge to be completed in a manner which results in a continuous and/or uninterrupted cut.

The task mentioned hereinbefore is also solved by a method with the features mentioned hereinbefore in that a rotary arm connected with a rotational drive guides a cutting means attached to the end of the rotary arm along a curved path, wherein a main cutting edge of the cutting means, which is set at least essentially parallel to the rotational axis of the rotary arm, plunges into the poultry body, and that the cutting means then separates the wishbone from the poultry body in a single uninterrupted cutting movement. Due to the alignment of the main cutting edge according to the invention and the guidance of the cutting means along the curved path it is possible in a particularly simple and cost-effective manner to separate the wishbone completely and without damage from the poultry body in a single, uninterrupted cutting movement. Furthermore, the advantages corresponding to the apparatus according to the invention can be attained by means of the method according to the invention.

An advantageous embodiment of the method is characterized in that a recess interrupting the main cutting edge is guided over the tip of the carina of the breastbone of the poultry body and/or over a clamping lever of the holding apparatus for fixating the poultry body such that the tip of the carina and/or the clamping lever passes at least in part through the recess. Thus it is ensured in a particularly simple and reliable manner that the wishbone can be separated from the poultry body in a single uninterrupted cutting movement. In other words, in the manner previously mentioned a collision can be simply and efficiently avoided with undesired elements of the carcass of the poultry body and/or elements of the holding apparatus.

An advantageous embodiment is characterized in that the main cutting edge is guided past the tip of the carina and/or the clamping lever on both sides in a single uninterrupted cutting movement. Here as well it can be ensured in an effective and reliable manner that the main cutting edge will not collide with elements of the carcass of the poultry body and/or of the holding apparatus, and thus the wishbone can be separated from the poultry body completely and without damage in a particularly simple and cost-effective manner. Moreover, the advantages mentioned for the preceding embodiment also apply.

A further advantageous embodiment of the method is characterized in that the cutting means is guided along a curved path leading between the tip of the carina of the breastbone and the opposing end of the wishbone and/or through the connecting area between the coracoids of the poultry body and the corresponding ends of the wishbone. Poultry bodies often have a tendon between the tip of the carina of the breastbone and the opposing end of the wishbone. In other words, between the tip of the carina of the breastbone and the opposing end of the wishbone there is an area without bone. The cutting means according to the invention, which is guided along the aforementioned curved path through the area last mentioned between the tip of the carina of the breastbone and the opposing end of the wishbone, thus leads neither to a collision with the wishbone nor to a collision with the tip of the carina of the breastbone. The coracoids and the corresponding ends of the wishbone are usually connected to one another by cartilage. Thus a cutting means which guides along the curved path through this connecting area between the coracoid and the corresponding ends of the wishbone also prevents damage of the wishbone to be separated.

A further advantageous embodiment of the method is characterized in that the main cutting edge cuts through the connecting area between the coracoids and the corresponding ends of the wishbone. Thus the wishbone is neither twisted out nor broken out of the poultry body. In other words, this embodiment ensures non-destructive separation of the wishbone from the poultry body.

An advantageous embodiment of the method is characterized in that an auxiliary cutting means of the recess cuts through the poultry body between the tip of the carina of the breastbone and the opposing end of the wishbone. In this process it is also particularly preferred that the previously mentioned tendon between the tip of the carina of the breastbone and the opposing end of the wishbone be severed. This advantageous embodiment enables the auxiliary cutting means to separate the end of the wishbone facing the breastbone from the poultry body. Thus this embodiment also ensures a contribution to the complete separation of the wishbone from the poultry body without damage.

An advantageous embodiment of the method is characterized in that a cut and/or a cutting speed of the cutting means are synchronized with the transport speed of the conveyor. Thus it can be ensured in a simple and reliable manner that the cutting means and/or the blades of the cutting means do not collide with the wishbone of the poultry body, so that the wishbone can be separated completely and without damage from the poultry body.

BRIEF DESCRIPTION

Further advantageous and/or appropriate features and embodiments result from the dependent claims and the description. A particularly advantageous embodiment will be explained based on the drawings provided. The drawings show:

DETAILED DESCRIPTION

Figure 1:
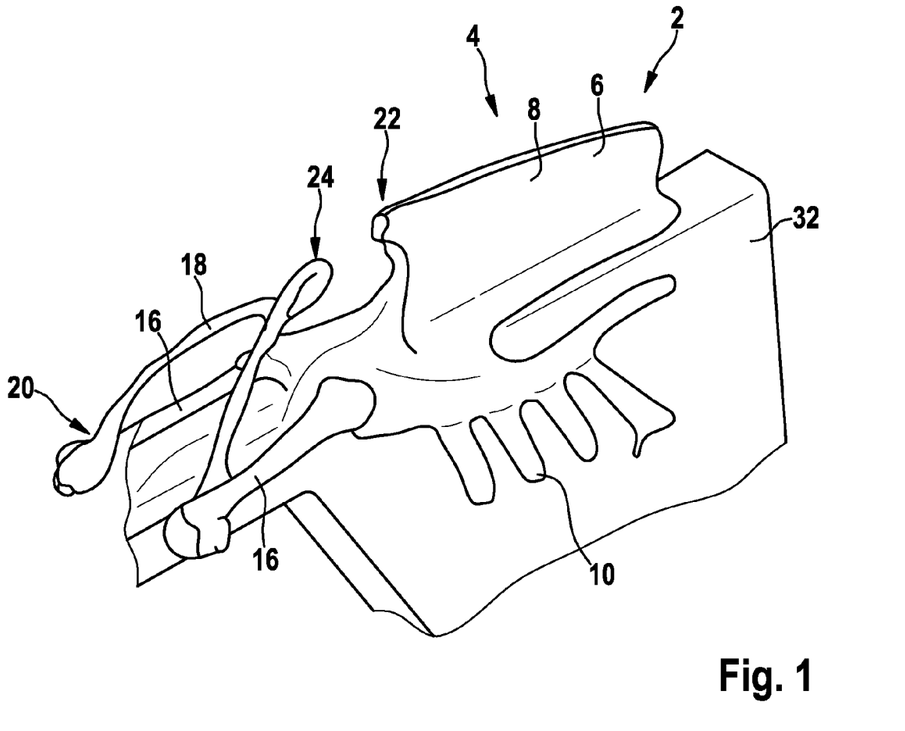
FIG. 1 a schematic representation of a body for a poultry body.

FIG. 1 depicts the skeleton of a carcass 2 of a poultry body 4. Even if the various meat sections of a poultry body are not depicted in FIG. 1, these meat sections are of course associated in reality with the corresponding bones of the carcass 2 of the poultry body 4. The carcass 2 has a breastbone 6 on the breast side, wherein the carina 8 of which is oriented away from the body. The poultry carcass 2 also has a plurality of ribs 10, two coracoids 16 and one wishbone 18. In the connecting areas 20, each coracoid 16 is connected to the wishbone 18. This connection is based primarily on cartilage. Moreover the tip of the carina 22 and the opposing end 24 of the wishbone 18 are usually connected to one another by a tendon. Furthermore, FIG. 1 also shows a support body 32 of a holding apparatus for receiving and holding the poultry body 4.

Figure 2:
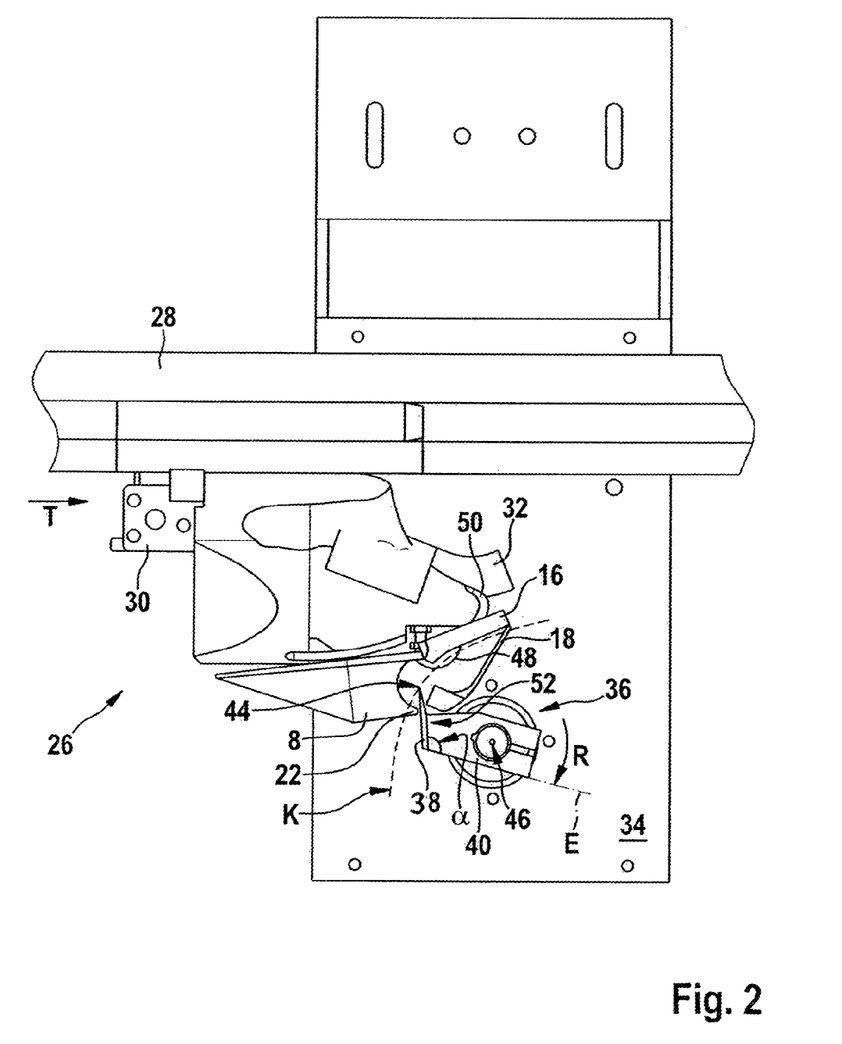
FIG. 2 a side view of the apparatus according to the invention.

FIG. 2 shows the apparatus 26 according to the invention for automatic separation of the wishbone 18 from eviscerated poultry bodies 4. The apparatus 26 comprises a revolving conveyor 28 with at least one holding apparatus 30 with a support body 32 for receiving and holding the poultry body 4 during transport through the apparatus 26. Moreover, the apparatus 26 has at least one processing station along a conveying line of the conveyor 28, wherein one of the processing stations is designed as a cutting unit 34 for separating the wishbone 18 from the poultry body 4. The cutting unit 34 itself has a rotational drive 36, a cutting means 38, and a rotary arm 40 connecting the cutting means 38 and the rotational drive 36, said arm being designed to guide the cutting means 38 in the rotational direction R along a curved path K. The rotary arm 40 and the cutting means 38 form an at least essentially L-shaped arrangement here. Moreover, the cutting means 38 has a main cutting edge 44 interrupted by a recess 42, said main cutting edge being oriented at least essentially parallel to a rotational axis 46 of the rotary arm 40.

The revolving conveyor 28 with the at least one holding apparatus 30 with the support body 32 for receiving and holding the poultry body 4 is known from the state of the art, and its basic principle is also described in great detail in the patent specification EP 0 401 528 B1 of the applicant. Reference is made to its description at this point with respect to these features and/or the basic principle. A further source for the basic principle of these features is found in the patent document DE 10 2006 040 454. Furthermore, it is known from the state of the art that an apparatus 26 for automatic separation of the wishbone 18 from the eviscerated poultry body 4 has at least one processing station along a conveying line of the conveyor 28. Along with the cutting unit 34 according to the invention, such processing stations can also include, for example, a skinning unit, a filleting unit, a clavicle removal unit and/or other necessary units. The cutting unit 34 according to the invention is preferably situated along the conveying line of the conveyor 28 behind a filleting unit which is designed to separate the fillet from the poultry body automatically.

The rotational drive 36 according to the invention of the cutting unit 34 is preferably a servo motor drive. However, other drive units are also fundamentally possible as rotational drive 36, in combination also being able to execute a translational motion in addition to rotational motion in order to guide the cutting means 38 in the rotational direction R along any curved path K. For this purpose a control and/or regulating unit can be assigned to the apparatus 26 for controlling and/or regulating the rotational drive 36, so that the cutting means 38 passes along a predefined and/or predefinable curved path K. The curved path K can therefore be a circular, or an elliptical or parabolic path. The choice of curved path K can depend on the geometric dimensions of the wishbone 18. In an advantageous embodiment, the curved path K is determined by the length of the wishbone 18. This is because to achieve complete, non-destructive removal of the wishbone 18 from the body 2 of the poultry body 4, the curved path K in an advantageous embodiment is determined through the poultry body 4 in such a manner that the main cutting edge 44 according to the invention passes by the wishbone 18. For this the cutting means 38 has a main cutting edge 44 interrupted by a recess 42 (not depicted), said main cutting edge being oriented at least essentially parallel to the rotational axis 46 of the rotary arm 40. Thus, the main cutting edge 44 can penetrate the area of the poultry body 4 between the coracoids 16 and the wishbone 18 without colliding with the carina 8 or with the wishbone 18. The rotary arm 40 and the cutting means 38 form an at least essentially L-shaped arrangement so that the recess 42 also does not collide with the carina 8 or with the wishbone 18. Due to this arrangement it is possible that a radial distance of the main cutting edge 44 from the rotational axis 46 of the rotary arm 40 is greater than the radial distance of the lowest point or edge of the recess 42 from the rotational axis 46 of the rotary arm 40. Based on this cutting unit 34 designed according to the invention, the main cutting edge 44 can be guided past "obstacles" such as the tip of the carina 22 or a clamping lever 48 of a clamping apparatus 50 of the holding apparatus 30.

Corresponding to the apparatus 26 according to the invention, the invention also relates to a method for automatic separation of the wishbone 18 from eviscerated poultry bodies 4 using a cutting means 38, wherein each poultry body 4 is held by a holding apparatus 30 of a revolving conveyor 28, wherein the conveyor transports the holding apparatuses in a direction of transport T along at least one processing station in which the wishbone 18 is separated from the poultry body 4, wherein a rotary arm 40 connected with a rotational drive 36 guides the cutting means 38 attached at the end 52 of the rotary arm 40 along a curved path K, wherein a main cutting edge 44 of the cutting means 38 oriented at least essentially parallel to the rotational axis 46 of the rotary arm 40 plunges into the poultry body 4, and wherein the cutting means 38 then separates the wishbone 18 from the poultry body 4 in a single uninterrupted cutting movement.

Thus the present invention provides an apparatus which is particularly simple and cost-effective as well as a corresponding method for complete, non-destructive removal of the wishbone 18 from the carcass 2 of an eviscerated poultry body 4.

Figure 3:
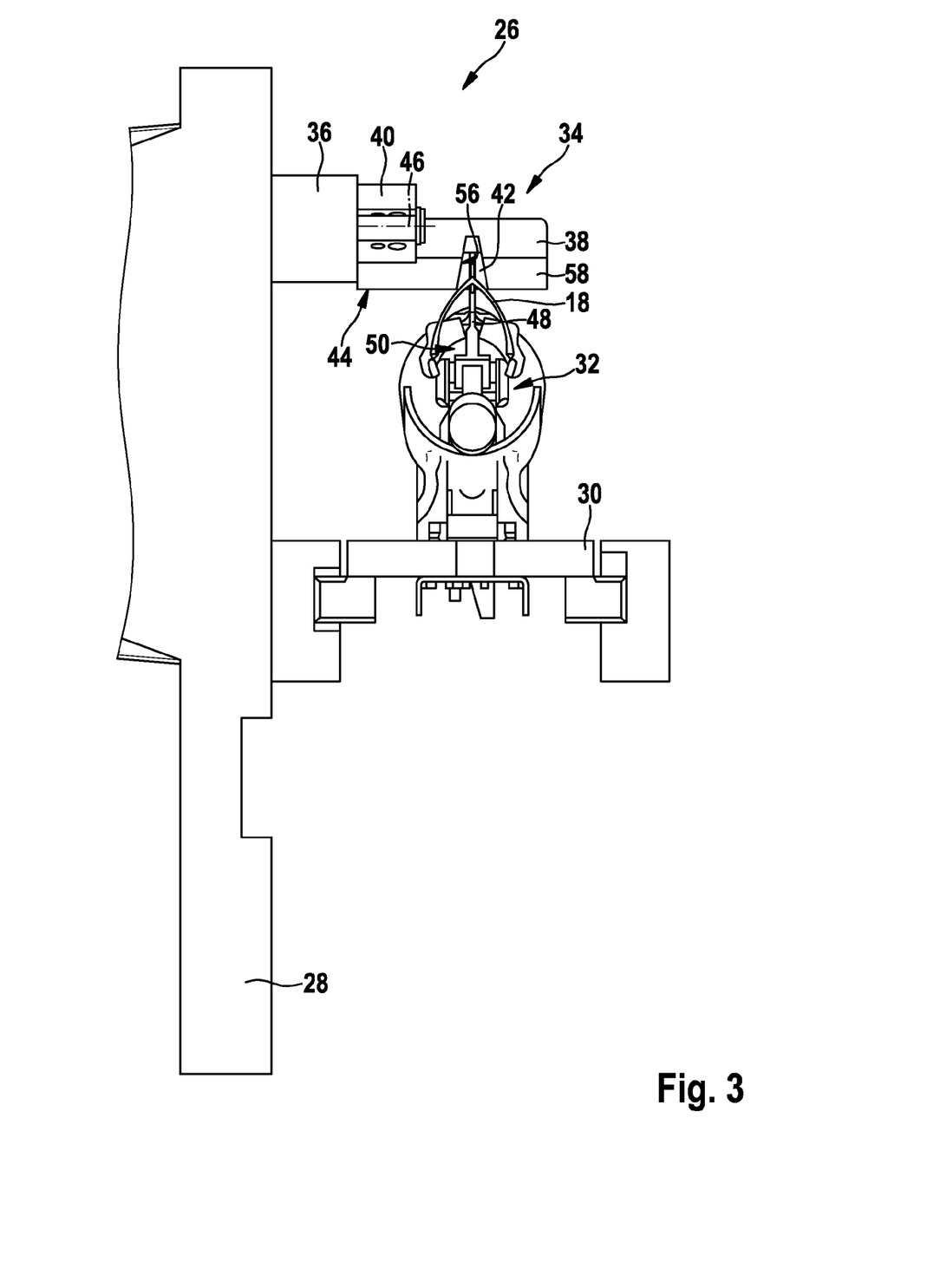
FIG. 3 a sectional view of the apparatus according to the invention.

In order to perform the automatic separation of the wishbone 18 from the eviscerated poultry body 4 with particular precision and repeatable quality, the holding apparatus 30 can have a clamping apparatus 50 with at least one clamping lever 48 which can be moved against the support body 32 to fixate the poultry body 4 on the support body 32. For this, the clamping lever 48 can be moved in the direction of the support body 32 in such a manner that the breastbone 46 or a breastbone plate of the breastbone 46 is clamped between the clamping lever 48 and the support body 32 and thus fixated. In a corresponding clamping position, the clamping lever 48 engages in the area between the wishbone 18, the coracoids 16 and the breastbone 6.

To facilitate an incision by the main cutting edge 44 without a collision and below the wishbone 18, the main cutting edge 44 is advantageously set up horizontally and perpendicular with respect to the direction of transport T of the holding apparatus 30.

Figure 4:
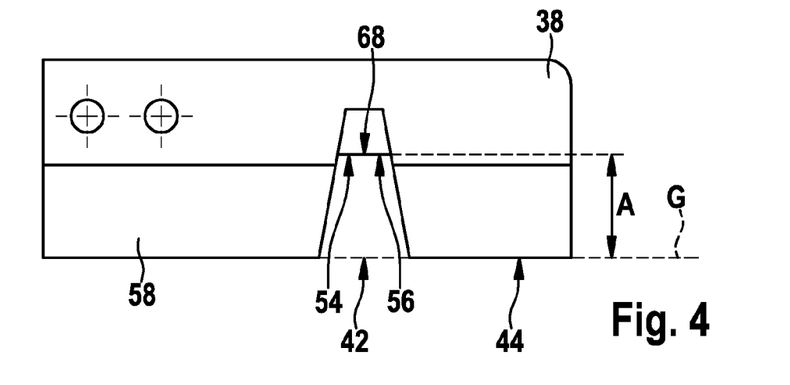
FIG. 4 a top view of the cutting means according to the invention.

In a further advantageous embodiment at least one of the processing stations is designed as a measuring station. It is also possible that one of the processing stations include measuring means, in particular also the cutting unit 34. The measuring stations or measuring means are designed for recording specific data (such as the size, geometry, length, width, height, etc.). The two shoulder joints of the poultry body 4 are particularly suited as measurement points which are preferably directed forward in the direction of transport T of the conveyor 28 and are able to be detected by advantageous measuring methods. The position of the poultry body 4 can be determined at any time using the recorded specific data and the knowledge of the direction of transport T, the transport speed and/or other relevant data of the conveyor 28. An advantageous embodiment of the invention is characterized in that an incision or a cutting speed of the cutting means 38 are synchronized with the transport speed of the conveyor 28 and/or with a position of the poultry body 4. Furthermore, it is possible that the speed of the cutting means is changed in dependence of the particularly determined length of the wishbone 18 such that the curved path K passes between the tip of the carina 22 of the breastbone 6 and the opposing end 24 of the wishbone 18 and/or through a connecting area 20 between the coracoids 16 and the corresponding ends of the wishbone. Advantageously, the cutting means 38, the rotary arm 40 and the rotational drive 36 are oriented with respect to the conveyor 28 in such a manner that the clamping lever 48 and/or the tip of the carina 22 of the breastbone 6 of the poultry body 4 can be guided through the recess 42 and/or that the main cutting edge 44 can be guided past the tip of the carina 22 and/or the clamping lever 48 on both sides. A corresponding embodiment of the cutting means 38 is depicted in FIG. 4. The main cutting edge 44 is interrupted by the recess 42. The depth A of the recess 42 can be adapted to the "obstacles", i.e. particularly the clamping lever 48 and/or the tip of the carina 22, along the curved path K of the cutting means 38 in such a manner that no collision with the "obstacles" occurs. In other words, the depth A of the recess 42 can be greater than the widest point 54 of the obstacle(s) protruding through the curved path K. With reference to FIG. 2, the depth A of the recess 42 can thus be greater than the distance between the tip of the carina 22 and the curved path K leading past in this area. Thus it is possible that the main cutting edge 44 is guided past the tip of the carina 22 and/or the clamping lever 48 on both sides in a single uninterrupted cutting movement. Moreover, it is possible that the recess 42 interrupting the main cutting edge 44 is guided over the tip of the carina 22 of the breastbone 6 of the poultry body 4 and/or over the clamping lever 48 of the holding apparatus 30 so that the tip of the carina 22 and/or the clamping lever 48 pass at least partially through the recess. Partially passing through in this context means that not the entire lever but for example only the part of the clamping lever 48 "cut" by the curved path passes through the recess 42.

An advantageous embodiment of the invention is characterized in that the cutting means 38 is arranged at an angle α between 80° and 135° with respect to the longitudinal axis E of the rotary arm 40. This is a preferred angular range which provides an essentially L-shaped arrangement between the rotary arm 40 and the cutting means 38.

A particularly advantageous embodiment of the cutting means 38 is depicted in FIG. 4, which is characterized in that the main cutting edge 44 is a straight cutting edge and/or is oriented along a common straight line G. An alternative embodiment of the cutting means 38 is characterized in that the main cutting edge 44 is a curved cutting edge, preferably symmetrical, and/or is oriented along a common curve. It is also possible that the main cutting edge 44 is a preferably symmetrical bent cutting edge. In summary, each of the previously mentioned embodiments of the main cutting edge 44 can ensure in a particularly simple and reliable manner that the main cutting edge 44 can plunge symmetrically into the poultry body 4 or beneath the wishbone 18 and thus also bring about an advantageous symmetrical distribution of force by the incision onto the poultry body 4 or the wishbone 18. The risk of breaking the wishbone is significantly reduced by the corresponding orientation of the main cutting edge 44.

The cutting means 38 is preferably constructed in one piece in order to facilitate a particularly high dimensional stability of the cutting means 38 and thus a particularly reliable, precise incision. A practical embodiment of the cutting means 38 is characterized in that at the lowest edge 54 of the recess 42 or at the base of the recess 42 an auxiliary cutting means 56 is formed in an orientation at least essentially parallel to the main cutting edge 44.

Figure 5:
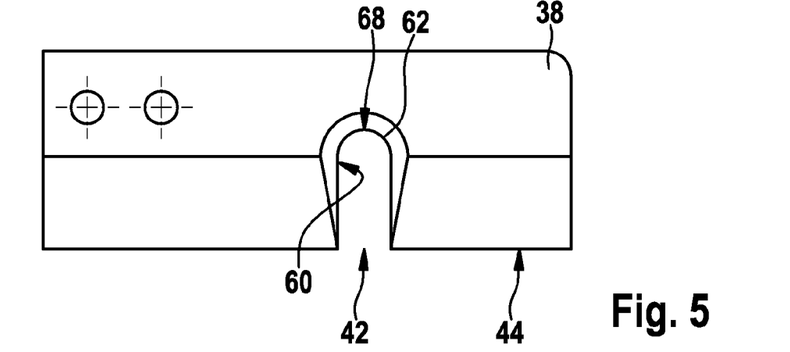
FIG. 5 is a top view of the cutting means according to an additional invention.

A further advantageous embodiment of the cutting means 38 is depicted in FIG. 5 and is characterized in that the cutting means 38 has a circumferential auxiliary cutting means 62 on the edge 60 facing the recess 42.

Figure 6:
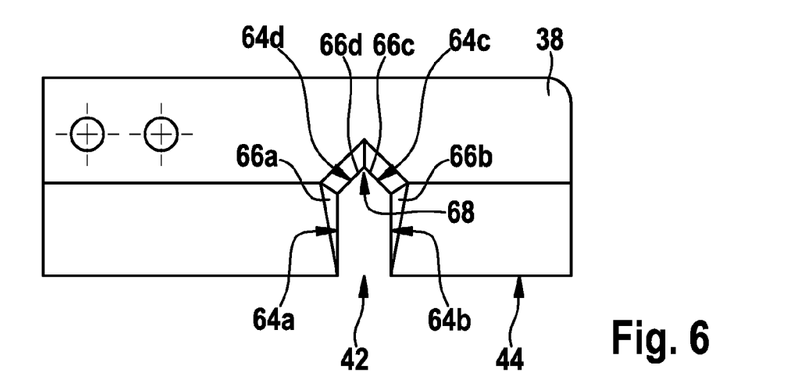
FIG. 6 is a top view of the cutting means according to an additional invention.

A further practical embodiment of the cutting means 38 is depicted in FIG. 6 and is characterized in that the cutting means 38 has two edges 64a, 64b facing each other and the recess 42, each having an auxiliary cutting means 66a, 66b. A further practical embodiment of the cutting means 38 is distinguished in that the cutting means 38 has an auxiliary cutting means 66a or 66a-66d on at least one edge 64a facing the recess 42, preferably on each of the edges 64a-64d facing the recess.

In the area of the recess 42, the main cutting edge makes no cut in or through the poultry body 4. However, this can be made up by the auxiliary cutting means 56, 60 or 64. This is because during a cutting movement of the cutting means 38 the auxiliary cutting means 56, 60 or 64 can cut the poultry body 4 at a time offset from the main cutting edge 44. This applies accordingly for penetration into the poultry body 4 as well. Even with such an embodiment of the invention, complete non-destructive removal of the wishbone 18 from the carcass 2 of the eviscerated poultry body 4 continues to be possible. This is because a radial distance of the main cutting edge 44 from the rotational axis 46 of the rotary arm 40 is preferably greater than the radial distance of the auxiliary cutting means 56 or the lowest point 68 the auxiliary cutting means 60 or 64 from the rotational axis 46 of the rotary arm 40. In other words, the L-shaped arrangement, the recess 42 and/or the at least one auxiliary cutting means 56, 60 or 64 can be embodied and/or designed so that a radial distance of the main cutting edge 44 from the rotational axis 46 of the rotary arm 40 is greater than the radial distance of the lowest point 68 of the recess, the lowest point 68 of the one auxiliary cutting means 56 or 60 and/or of the lowest point 68 of an arrangement of multiple auxiliary cutting means 66 from the rotational axis 46 of the rotary arm 40.

A further advantageous embodiment of the invention is characterized in that the cutting means 38 has at least one guiding surface 58 starting from the main cutting edge 44 and extending in the direction of the rotary arm 40 and/or of the auxiliary cutting means 56, 60 or 64. This enables the part of the poultry body 4 not cut by the recess 42 of the main cutting edge 44 to be guided to the auxiliary cutting means 56. Thus, the cut edges in the poultry body 4 made by the main cutting edge 44 and directed toward the recess 42 can likewise be guided to the auxiliary cutting means 56. Thus, the auxiliary cutting means 56, 60 or 64 can cut or sever the poultry body 4 between the previously mentioned cut edges. Although this is a two-step cut, the result of the cuts by the main cutting edge 44 and the auxiliary cutting means 56, 60 or 64 is an integrated, continuous and/or uniform cut. In other words, although the main cutting edge 44 and the auxiliary cutting means 56, 60 or 64 cut the poultry body 4 at different points in time, the result is not a steplike cut in or through the poultry body. Instead, the cut resembles one which can be made, for example, by an uninterrupted blade.

It has been explained previously that the cutting unit 34 according to the invention is preferably designed and/or constructed to be guided past possible obstacles along a curved path K. In particular considering the previously mentioned features, an advantageous embodiment of the invention is characterized in that the auxiliary cutting means 56, 60 or 64 of the recess 42 cuts through the poultry body 4 between the tip of the carina 22 of the breastbone 6 and the opposing end of the wishbone 18. Hereby in particular the corresponding tendon can be severed. A practical further development is characterized in that the main cutting edge 44 cuts through the connecting area 20 between the coracoids 16 and the corresponding ends of the wishbone. Advantageously, the cutting means 38 can be guided along the curved path K passing between the tip of the carina 22 of the breastbone 6 and the opposing end 24 of the wishbone 18 and/or through the connecting area 20 between the coracoids 16 and the corresponding ends of the wishbone 18.

Corresponding to the preceding explanations of the apparatus according to the invention or the method according to the invention and their advantageous further developments, FIG. 3 shows a sectional view of the apparatus 26 according to the invention. According to this it is advantageous if the recess 42 is arranged in the middle or axially centred with respect to the clamping lever 48 and/or to the tip of the carina 22, in particular along the curved path K.

The invention claimed is:

1. Apparatus for automatically separating the wishbone from eviscerated poultry bodies, comprising a revolving conveyor with at least one holding apparatus with a support body for receiving and holding the poultry bodies during transport through the apparatus, and at least one processing station along a conveying line of the conveyor, wherein one of the processing stations is designed as a cutting unit for separating the wishbone from the poultry body, characterized in that the cutting unit has a rotational drive, a cutting means and a rotary arm connecting the cutting means and the rotational drive, said arm being designed to guide the cutting means in the rotational direction along a curved path, wherein the rotary arm and the cutting means form an at least essentially L-shaped arrangement and the cutting means has a main cutting edge interrupted by a recess which is oriented at least essentially parallel to the rotational axis of the rotary arm.

2. Apparatus according to claim 1, characterized in that the holding apparatus has a clamping apparatus with at least one clamping lever moveable against the support body to fixate the poultry body on the support body.

3. Apparatus according to claim 1, characterized in that the main cutting edge is oriented horizontally and perpendicular with respect to a direction of transport of the holding apparatus.

4. Apparatus according to claim 2, characterized in that the cutting means, the rotary arm and the rotational drive are oriented with respect to the conveyor in a manner that the clamping lever and/or the tip of the carina of the breastbone of the poultry body is guidable through the recess and/or that the main cutting edge is guidable past the tip of the carina and/or the clamping lever on both sides.

5. Apparatus according to claim 2, characterized in that the clamping lever is designed to grip in a clamping position in the area between the wishbone, the coracoid and the breastbone of the poultry body.

6. Apparatus according to claim 1, characterized in that the width of the recess is greater than the greatest width of the clamping lever and/or the tip of the carina of the breastbone.

7. Apparatus according to claim 1, characterized in that the cutting means is arranged at an angle between 80 degrees and 135 degrees with respect to a longitudinal axis E of the rotary arm.

8. Apparatus according to claim 1, characterized in that the cutting means is constructed in one piece.

9. Apparatus according to claim 1, characterized in that an auxiliary cutting means is designed on the lowest edge of the recess and oriented at least essentially parallel to the main cutting edge.

10. Apparatus according to claim 1, characterized in that the cutting means has at least one guiding surface starting from the main cutting edge and extending in the direction of the rotary arm.

11. Apparatus according to claim 10, characterized in that a radial distance of the main cutting edge from the rotational axis of the rotary arm is greater than the radial distance of the auxiliary cutting means from the rotational axis of the rotary arm.

12. Method for automatically separating the wishbone from eviscerated poultry bodies using a cutting means, wherein each poultry body is held by a holding apparatus of a revolving conveyor, wherein the conveyor transports the holding apparatus in a direction of transport along at least one processing station, by means of which the wishbone is separated from the poultry body, characterized in that a rotary arm associated with a rotational drive guides a cutting means attached at the end of the rotary arm along a curved path, wherein the main cutting edge of the cutting means, which is oriented at least essentially parallel to the rotational axis of the rotary arm plunges into the poultry body, and that the cutting means then separates the wishbone from the poultry body 44 in a single uninterrupted cutting movement.

13. Method according to claim 12, characterized in that a recess interrupting the main cutting edge is guided over the tip of the carina of the breastbone of the poultry body and/or over a clamping lever of the holding apparatus for fixating the poultry body such that the tip of the carina and/or the clamping lever passes at least in part through the recess.

14. Method according to claim 13, characterized in that the main cutting edge is guided past the tip of the carina and/or the clamping lever on both sides in a single uninterrupted cutting movement.

15. Method according to claim 12, characterized in that the cutting means is guided along a curved path leading between the tip of the carina of the breastbone and the opposing end of the wishbone and/or through the connecting area between the coracoids and the corresponding ends of the wishbone.

16. Method according to claim 12, characterized in that an auxiliary cutting means of the recess cuts through the poultry body between the tip of the carina of the breastbone and the opposing end of the wishbone.

17. Method according to claim 12, characterized in that the main cutting edge cuts through the connecting area between the coracoids and the corresponding ends of the wishbone.

18. Method according to claim 12, characterized in that an incision and/or a cutting speed of the cutting means are synchronized with the transport speed of the conveyor.

* * * * *